US009794346B2

(12) United States Patent
Followell et al.

(10) Patent No.: US 9,794,346 B2
(45) Date of Patent: Oct. 17, 2017

(54) MONITORING SYSTEMS OF A VEHICLE BY GENERATING AND TRANSMITTING CUSTOMIZED INFORMATION MESSAGES TO WIRELESS NETWORKED COMPUTERS

(71) Applicant: THE BOEING COMPANY, Chicago, IL (US)

(72) Inventors: David Followell, Wildwood, MO (US); Kevin Swearingen, Saint Charles, MO (US); Jeanne C. Maggiore, Seattle, WA (US); Bradley Mitchell, Snohomish, WA (US); Erik B. Fries, Renton, WA (US); Stephen G. Dame, Everett, WA (US)

(73) Assignee: The Boeing Company, Chicago, IL (US)

( * ) Notice: Subject to any disclaimer, the term of this patent is extended or adjusted under 35 U.S.C. 154(b) by 168 days.

(21) Appl. No.: 13/710,958

(22) Filed: Dec. 11, 2012

(65) Prior Publication Data
US 2014/0164555 A1     Jun. 12, 2014

(51) Int. Cl.
*G06F 15/16*     (2006.01)
*H04L 29/08*     (2006.01)
*G07C 5/08*     (2006.01)

(52) U.S. Cl.
CPC .............. *H04L 67/12* (2013.01); *G07C 5/085* (2013.01); *G07C 5/0808* (2013.01)

(58) Field of Classification Search
CPC .................. H04L 67/12; G07C 5/085
(Continued)

(56) References Cited

U.S. PATENT DOCUMENTS 7,275,053 B1 *   9/2007   Gardner ................ H04L 43/045
7,397,353 B2     7/2008   Myhre et al.
(Continued)

FOREIGN PATENT DOCUMENTS

CN     102426778 A     4/2012
CN     102508493 A     6/2012
(Continued)

OTHER PUBLICATIONS

Kaan But, Peter Omiyi, and Yang Yang (0163-6804/10 Copyrights Jul. 2010 IEEE—Wireless Sensor and Actuator Networks: Enabling the Nervous System of the Active Aircraft).*
(Continued)

*Primary Examiner* — Bryan Lee
*Assistant Examiner* — Oluwatosin Gidado
(74) *Attorney, Agent, or Firm* — Charles L. Moore; Moore & Van Allen PLLC

(57) ABSTRACT

A method for monitoring systems of a vehicle may include determining relevant information used by at least one of a plurality of wireless networked computers based on at least a function performed by the at least one wireless networked computer with respect to an associated one of a multiplicity of components of the systems of the vehicle. The method may also include formulating a customized information message for the at least one of the plurality of wireless networked computers based on at least the relevant information used and the function performed by the at least one wireless networked computer. The method may further include transmitting the customized information message to the at least one of the plurality of wireless networked computers.

29 Claims, 5 Drawing Sheets

(58) Field of Classification Search
USPC .................................................. 709/217, 238
See application file for complete search history.

(56) References Cited

U.S. PATENT DOCUMENTS

| | | | |
|---|---|---|---|
| 7,489,992 | B2 | 2/2009 | Valette et al. |
| 7,490,793 | B2 | 2/2009 | Mackness |
| 7,755,512 | B2 | 7/2010 | Ziarno |
| 8,387,127 | B1* | 2/2013 | Narver ............... H04L 63/0281 713/100 |
| 8,856,322 | B2* | 10/2014 | Dare ..................... G06F 9/4445 709/224 |
| 2004/0008253 | A1* | 1/2004 | Monroe ....................... 348/143 |
| 2005/0159184 | A1* | 7/2005 | Kerner et al. ............... 455/558 |
| 2005/0258938 | A1* | 11/2005 | Moulson ............... H04M 1/575 340/7.58 |
| 2007/0086049 | A1* | 4/2007 | Lee ....................... G06F 21/445 358/1.15 |
| 2010/0070785 | A1* | 3/2010 | Fallin .................. G08B 13/248 713/320 |
| 2010/0125857 | A1* | 5/2010 | Dommeti et al. ........... 719/326 |
| 2010/0174439 | A1* | 7/2010 | Petricoin et al. .............. 701/29 |
| 2010/0274468 | A1* | 10/2010 | Durham et al. ............. 701/120 |
| 2013/0131914 | A1* | 5/2013 | Goebel ................. G06Q 10/06 701/32.7 |
| 2014/0204044 | A1* | 7/2014 | Mak-Fan et al. ............. 345/173 |

FOREIGN PATENT DOCUMENTS

| | | |
|---|---|---|
| CN | 102564438 A | 7/2012 |
| CN | 102582826 A | 7/2012 |

OTHER PUBLICATIONS 0163-6804/10 Copyrights Jul. 2010 IEEE—Wireless Sensor and Actuator Networks: Enabling the Nervous System of the Active Aircraft.*

Bur et al. (0163-6804/10 Copyrights Jul. 2010 IEEE—Wireless Sensor and Actuator Networks: Enabling the Nervous System of the Active Aircraft).*

European Patent Office, European Application No. 13189079.0 Extended European Search Report dated Jan. 30, 2014, pp. 1-10.

Bur, Kaan et al., "Wirelass Sensor and Actuator Networks: Enabling the Nervous System of the Active Aircraft," IEEE Communications Magazine, Jul. 2010. pp. 118-125.

European Patent Office; Office Action for European Patent Application No. 13189079.0 dated Jan. 5, 2016, 7 Pages.

Australian Patent Office; Examination Report for Australian Application No. 2013219155 dated Dec. 8, 2016, 3 pages.

Chinese Patent Office; Office Action for Chinese Patent Application No. 201310664769.9 dated May 12, 2017, 19 Pages.

* cited by examiner

| | 204 | 208 | 210 | 212 |
|---|---|---|---|---|
| | RELEVANT INFO A | ... | RELEVANT INFO N | CONDITIONS/CRITERIA, ETC. | SPEC FOR FORMATTING AND XMTNG, ETC. |
| WNC1 | GROUND SPEED INFO | ENGINE RPM | LANDING GEAR STATUS | WEIGHT ON WHEELS | CONTINUOUS DETECT WEIGHT ON WHEELS AND SPEED>X |
| WNC2 | LOCATION INFO | TIME OF DAY BASED ON LOCATION | WINDOW DIMMER CONTROL STATUS | FLIGHT CREW CONTROL SETTING | PREDEFINED PROTOCOL |
| WNC3 | | | | | |
| ... | | | | | |
| WNCn | AIR SPEED INFO | STATUS HYDRAULIC PUMP 5 | HYDRAULIC PRESSURE IN LINE 288 | WAKE UP 60 MINUTES BEFORE ETA | XMT UPDATE 30 SEC INTERVALS |

(202 labels the WNC column)

FIG. 2

MONITORING SYSTEMS OF A VEHICLE BY GENERATING AND TRANSMITTING CUSTOMIZED INFORMATION MESSAGES TO WIRELESS NETWORKED COMPUTERS

FIELD

The present disclosure relates to vehicles and monitoring vehicle systems, and more particularly to a method and system for monitoring systems of a vehicles by generating and transmitting customized messages to wireless networked computers.

BACKGROUND

Multiple sensors are typically used to monitor the condition or health of components of different systems of a complex vehicle, such as an aircraft or other vehicle. Frequently, sensors are in vehicle locations were the weight, volume, and routing of wiring for communications and power is not practical. Wireless networked computers (WNCs) may typically be connected to or interface with multiple sensors to provide energy management and reduce wiring. WNCs are frequently battery-powered. To economize on electrical power usage, WNCs are frequently designed to remain quiescent until a time interval is detected. This approach is not the most power efficient strategy and periodic checks at the specific time interval may not coincide with certain events which can result in delayed reactions or missed triggers. Additionally, WNCs usually have limited interface capacity. The wired interfaces of WNCs are usually allocated to the highest priority sensors and buses. Accordingly, connections to receive some desired signals, sensor outputs, or buses will usually be omitted from the final design in the interest of controlling interface size and complexity. For multiple distributed wireless networks, each network may require common vehicle information such as speed, estimated time of arrival, running time, tire pressure and other parameters. Accordingly, under some circumstances, there may be a need to share common sensor information across disparate networks.

SUMMARY

In accordance with an embodiment, a method for monitoring systems of a vehicle may include determining relevant information used by at least one of a plurality of wireless networked computers based on at least a function performed by the at least one wireless networked computer with respect to an associated one of a multiplicity of components of the systems of the vehicle. The method may also include formulating a customized information message for the at least one of the plurality of wireless networked computers based on at least the relevant information used and the function performed by the at least one wireless networked computer. The method may further include transmitting the customized information message to the at least one of the plurality of wireless networked computers.

In accordance with another embodiment, a system for monitoring systems of a vehicle may include a plurality of wireless networked computers and a vehicle data recorder. The vehicle data recorder may include a processor configured to determine relevant information used by at least one of the plurality of wireless networked computers based on at least a function performed by the at least one wireless networked computer with respect to an associated one of a multiplicity of components of the systems of the vehicle. The processor may also be configured to formulate a customized information message for the at least one of the plurality of wireless networked computers based on at least the relevant information used and the function performed by the at least one wireless networked computer. The vehicle data recorder may further include a transceiver to transmit the customized information message to the at least one of the plurality of wireless networked computers.

In accordance with further embodiment, a computer program product for monitoring systems of a vehicle may include a computer readable storage medium having computer readable program code embodied therewith. The computer readable program code may include computer readable program code configured to determine relevant information used by at least one of a plurality of wireless networked computers based on at least a function performed by the at least one wireless networked computer with respect to an associated one of a multiplicity of components of the systems of the vehicle. The computer readable program code may also include computer readable program code configured to formulate a customized information message for the at least one of the plurality of wireless networked computers based on at least the relevant information used and the function performed by the at least one wireless networked computer. The computer readable program code may further include computer readable program code configured to transmit the customized information message to the at least one of the plurality of wireless networked computers.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

FIG. 2 is an example of a configuration table for use in configuring customized information messages for generation and transmission to different wireless networked computers of a vehicle in accordance with an embodiment of the present disclosure.

DESCRIPTION

Figure 1A:
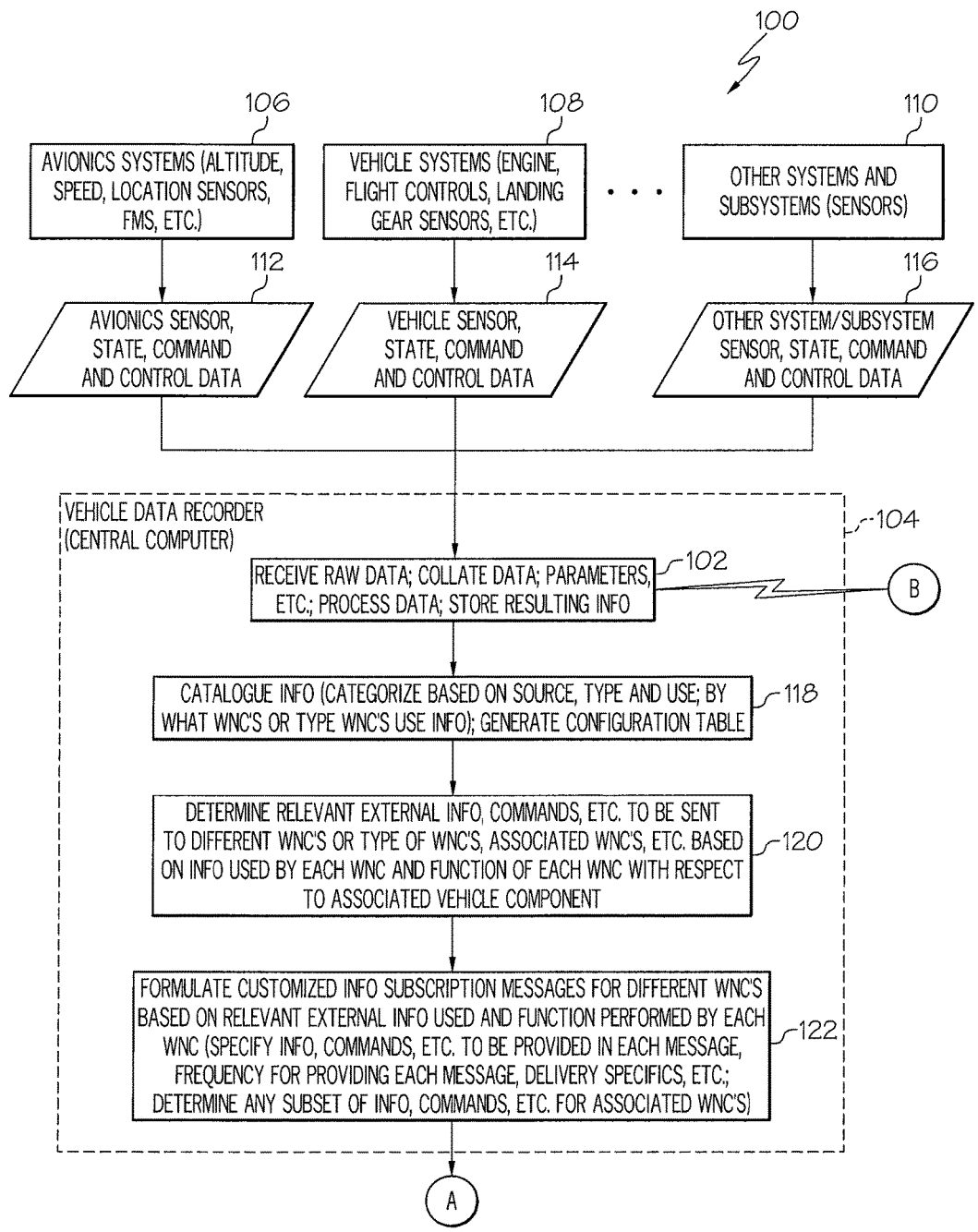
FIGS. 1A and 1B (collectively FIG. 1) are a flow chart of an example of a method for generating and transmitting customized messages to different wireless networked computers of a vehicle in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that is not a computer readable signal medium and that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
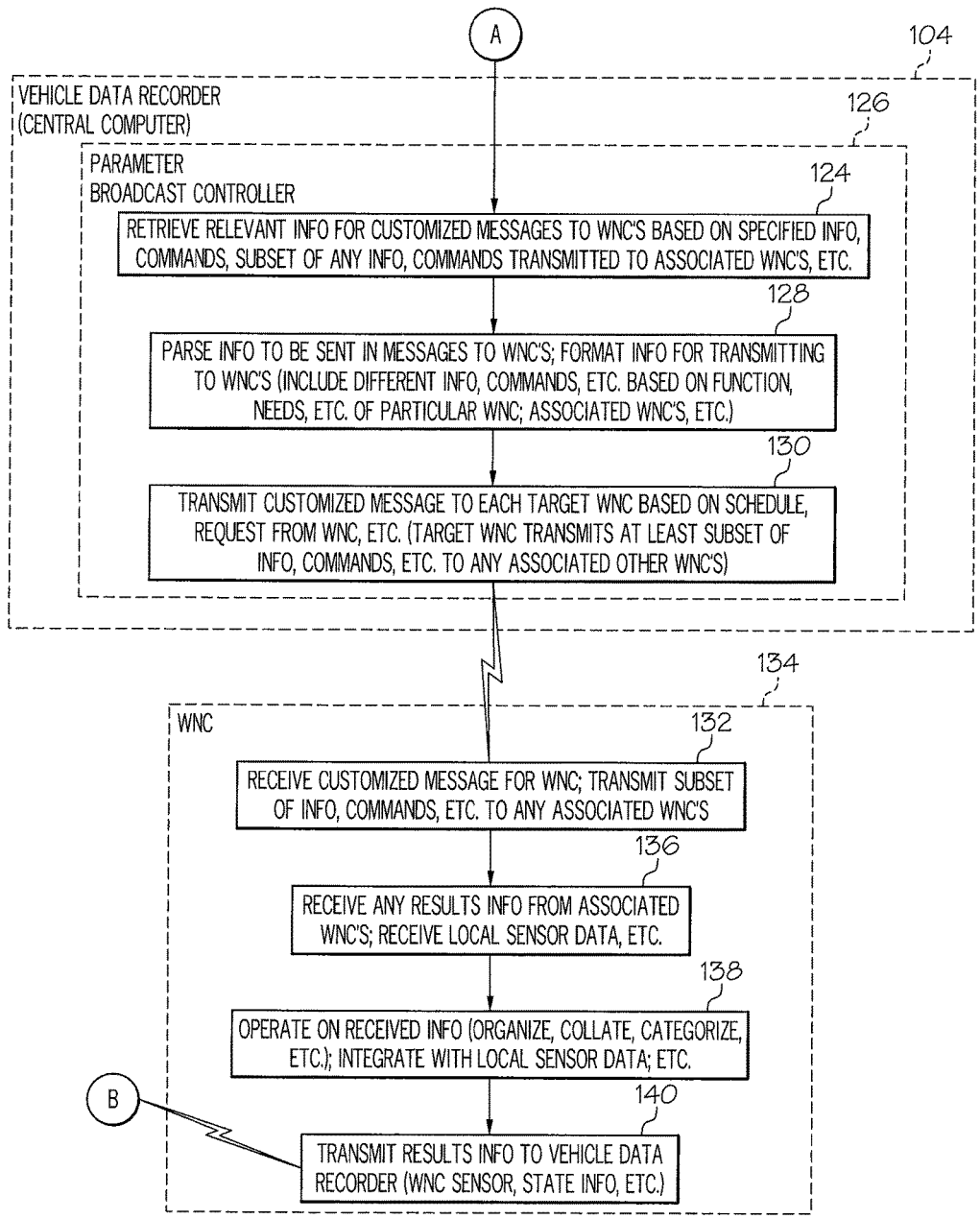

FIGS. 1A and 1B (collectively FIG. 1) are a flow chart of an example of a method 100 for generating and transmitting customized messages to different wireless networked computers of a vehicle in accordance with an embodiment of the present disclosure.

In block 102, raw data may be received from different systems of the vehicle. The vehicle may be an aerospace vehicle or aircraft, watercraft, or terrestrial vehicle. The raw data may be received by a vehicle data recorder 104, central computer or similar device of the vehicle. Examples of the vehicle systems may include but is not necessarily limited to avionics systems 106, vehicle systems 108, such as engines, flight controls, landing gear, cabin environment, and other systems or subsystems 110. Sensors associated with the avionics systems 106, such as altitude sensors, speed sensors, location sensors, flight management system (FMS) and other avionics systems may provide avionics sensor, state, command and control data 112 to the vehicle data recorder 104. Sensors associated with the vehicle systems 108 may provide vehicle sensor, state, command and control data 114, and sensors associated with other systems and subsystems 110 of the vehicle may provide other sensor, state command and control data 116 of other systems or subsystems to the vehicle data recorder 104.

The raw data may be collated and processed in block 102 and the resulting information stored in a data store associated with the vehicle data recorder 104. To be useful for WNCs the collating and processing of the raw data may include but is not necessarily limited to filtering the data, voting or selecting a most reliable channel, if a source of the data contains more than one redundant channel, validating the data against other sources or other procedures to refine the data and provide information useable by the WNCs. Translation, scaling, offset adjustment, decompression, or other manipulation may also be performed on the data or information prior to being transmitted to the WNCs. The data may also require collation and clustering with other data that is received by the vehicle data recorder 104 at different rates from a sensor or other source.

In block 118, the information may be catalogued or categorized. For example, the information may be catalogued or categorized based on the source of the information or data, type of information or data, use of the information, by which WNC's or type of WNC's use the information or other criteria for classifying or cataloging the information or data.

A configuration table may be generated in block 118. The configuration table may be used to formulate customize information subscription messages similar to that described herein. An example of a configuration table 200 is illustrated in FIG. 2. The configuration table 200 may include a listing of the WNCs 202 targeted or designated to receive customized information messages. The configuration table 200 may also include the relevant information 204-208 associated with each WNC, any conditions or criteria 210 associated with use of the relevant information 204-208 or operation of the WNC, and may also include a specification 212 for formatting and transmitting the customized information message to each WNC. For example, a rate or frequency for transmitting the customized information message to a particular WNC may be specified.

The configuration table 200 may also include an identification of any associated WNCs of the target or designated WNC that receives the customized information message. The target WNC that receives the customized information message may formulate and transmit a subset of information and commands, or secondary customized information message, to the associated WNC or WNCs for operation of the associated WNC in monitoring a condition of a particular component of a vehicle system. The associated WNC may return resulting data or information to the target WNC based on the received secondary message and any operations performed by the associated WNC relative to the monitored component. As described in more detail herein, data from the associated WNC may be integrated with other sensor data and information by the target WNC and transmitted to the vehicle data recorder 104 for processing similar to that described herein and overall monitoring of the vehicle systems.

Returning to FIG. 1A, in block 120, relevant external information and commands, if any commands, to be sent to different WNCs or type WNCs and associated WNCs may be determined. The relevant information and any commands may be determined based on criteria, such as information used by each WNC, a function performed by each WNC with respect to monitoring an associated one of a multiplicity of components of the systems of the vehicle, or other criteria.

In block 122, customized information subscription messages may be formulated for different WNCs. The customized information messages may be formulated based on the relevant external information used by each WNC, a function or functions performed by each WNC with respect to the associated component or system being monitored. The customized information messages may be formulated by specifying the information, commands or the like to be provided in each message; the frequency or rate for providing each message; any specifications for delivering the customized information message to the WNC or target WNC; any associated WNC; and information and commands to be transmitted by the target WNC to any associated WNC.

In block 124, relevant information and any commands for the customized messages to be sent to the respective WNCs may be retrieved based on the specific information, commands, subset of any information, and any commands to be transmitted to an associated WNC for each message. The relevant information and any commands for the customized messages may be retrieved by a parameter broadcast controller 126. The parameter broadcast controller 126 maybe part of the vehicle data recorder 104 or may be a separate device or module operating on a processor.

In block 128, the relevant information may be parsed and formatted for transmitting to the WNC's. The information may be parsed and formatted based on the function and needs of the particular WNC and any associated WNC. The processing may include translation, scaling, offset adjustment, compression, decompression, or other manipulation of the information to formulate the customized information message based on the particular WNC or needs of the WNC and any associated WNC. The information or data may also require collation and clustering with other information or data that is received at different rates.

In block 130, the customized information message may be transmitted to each target or designated WNC based on predetermined criterion. The predetermined criterion may include a rate of transmission based on the component being monitored, a frequency of the relevant information being updated, an operational status of the component being monitored, and an operational status of the vehicle, etc. If there are any associated WNCs, the target or designated WNC may transmit at least a subset of the information and any commands to the associated WNC or WNCs.

Blocks or modules 124, 128 and 130 may be embodied in and performed by the parameter broadcast controller 126.

In block 132, the customized information message may be received by a WNC 134 for which the customized information message is intended or targeted. If there are any associated WNCs, a subset of information and any commands that may form a secondary customized information message may be transmitted by the target WNC to the associated WNC or WNCs.

In block 136, results information from any associated WNC may be received by the WNC 134. Local sensor data may also be received by the WNC 134 in block 136.

In block 138, the WNC 134 may operate on the received information or data from the local sensors and from any associated WNC. The received information may be organized, collated categorized, etc. The local sensor data may also be integrated with the received information.

In block 140, the results information from integrating the local sensor data and received information may be transmitted to the vehicle data recorder 104. The results information may include WNC sensor and state information.

Figure 3:
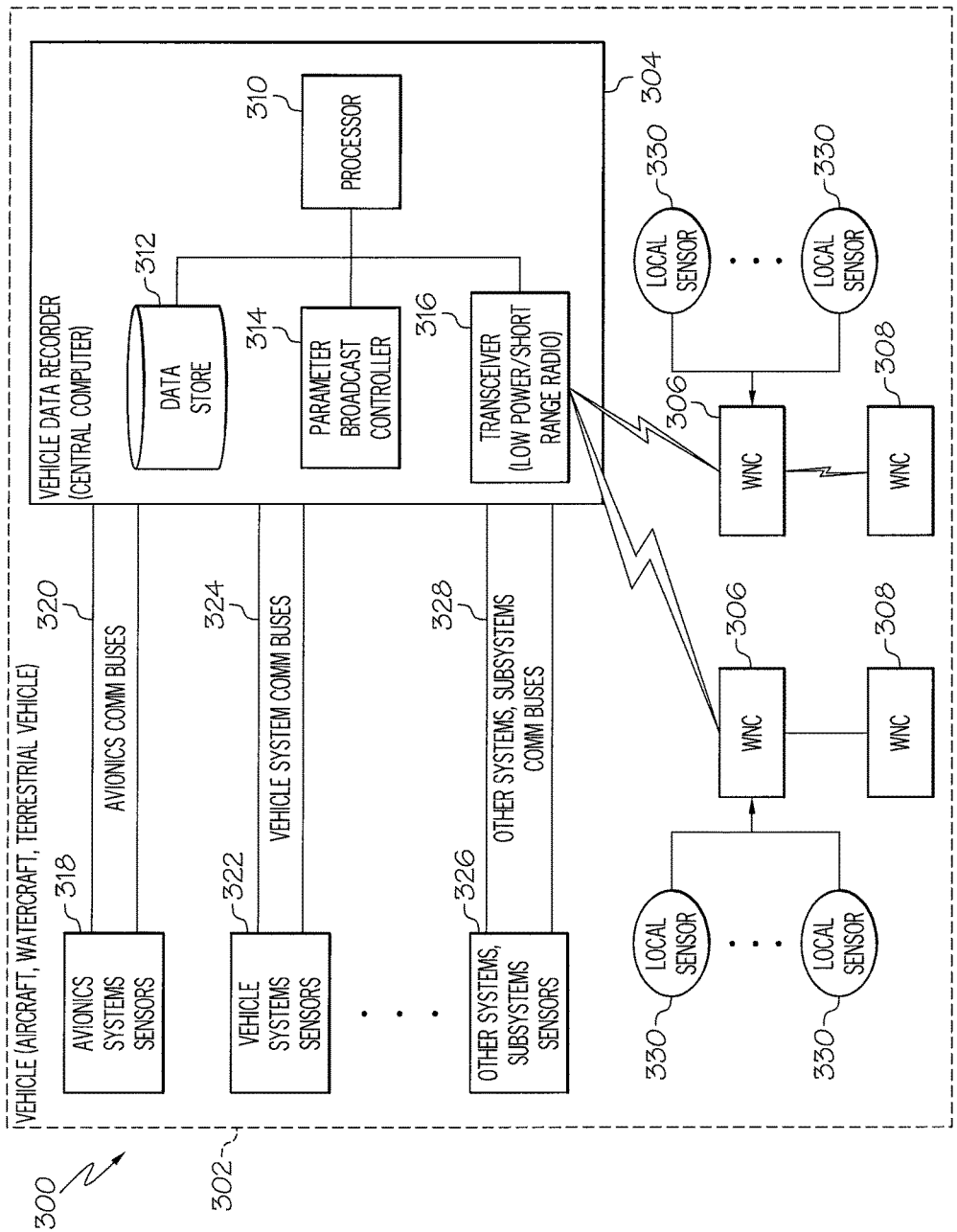
FIG. 3 is an example of a system for generating and transmitting customized messages to different wireless networked computers of a vehicle in accordance with an embodiment of the present disclosure.

FIG. 3 is an example of a system 300 for generating and transmitting customized messages to different wireless networked computers (WNCs) of a vehicle 302 in accordance with an embodiment of the present disclosure. The operations described with respect to FIGS. 1A and 1B may be embodied in and performed by components of the system 300. The vehicle 302 may be an aircraft or aerospace vehicle, watercraft, or terrestrial vehicle.

The system 300 may include a vehicle data recorder 304 or central computer and a plurality of WNCs 306. Associated WNCs 308 may be connected to the WNCs 306 by either a wired or wireless connection as illustrated in FIG. 3. This structure minimizes wiring, reduces complexity and weight and radio bandwidth.

The vehicle data recorder 304 may include a processor 310 for controlling operation of the vehicle data recorder 304 and for performing operations similar to those described herein. The vehicle data recorder 304 may also include a data store 312, a parameter broadcast controller 314 and transceiver 316. The vehicle data recorder 304 may receive avionics data from avionics systems sensors 318 via avionics communications buses 320. The avionics data may be stored in a data store 312. The vehicle data recorder 304 may also receive data from vehicle systems sensors 322 over vehicle systems communications buses 324 and data from other systems and subsystems sensors 326 via the communications buses 328. The vehicle systems data and other systems or subsystems data may also be stored in a data store 312.

The parameter broadcast controller 314 may retrieve the relevant information from the data store 312 and may formulate or generate the customized information messages from the relevant data similar to that previously described. The parameter broadcast controller 314 may parse the information and format the information in a form usable for each WNC 306.

The transceiver 316 may transmit the customized information messages to the respective WNCs 306 according to a predetermined criterion. The transceiver 316 may be a low power/short range radio, such a WiFi, ZigBee radio or a similar low power or short range radio with a range limited substantially to within the vehicle's structure. The transceiver may have sufficient power or range for communication with the WNCs 306 on the vehicle 302. Similar to that previously described, the predetermined criterion may include a rate of transmission based on the component or system being monitored, a frequency of the relevant information being updated, an operational status of the component being monitored, and an operational status of the vehicle, etc.

The target or designated WNCs 306 may extract a subset of the information and/or commands from the customized information message or may formulate another or secondary customized information message based on the received customized information message. The other or secondary customized information message may be transmitted wirelessly or by a wired connection to the associated WNC 308. In this manner, wire routing and transmission bandwidth may be minimized and efficiently used.

A plurality of local sensors 330 may be coupled to the WNCs 306. While not shown in FIG. 3 local sensors may also be coupled to the associated WNCs 308. Each of the sensors 330 may be associated with a system or component of a system of the vehicle 300 for monitoring a condition of the component or system.

The system 300 provides the WNCs 306 and 308 access to vehicle information with minimum resource requirements. The system 300 includes an architecture that provides an efficient use of WNCs for vehicle applications, such as aircraft or aerospace vehicles. Collecting sensor data, vehicle operating modes, and commands in a central location or vehicle data recorder 304 and transmitting wake-up messages and customized information messages to specific WNCs allows wireless networks to receive the relevant information in the most efficient means possible without using power and radio bandwidth to request the information or test for availability of the information. Furthermore, as described above, specific WNCs may be assigned to broadcast a subset of the information to other associated WNCs. This allows for the efficient use of limited input/output ports for unique local sensors and effectors. The arrangement also provides efficient use of limited local processing capability, minimal weight of sensors, effectors and wires and the efficient use of limited electrical power. This efficient savings makes battery-powered, energy harvesting and very low power computing nodes or WNCs practical. Vehicle parameters that may be broadcast may include, for example, estimated time of arrival, weight on wheels, passenger cabin modes, etc. these parameters may be broadcast on a specific predictable schedule or time interval to allow the low power nodes to remain in quiescent mode until just prior to these expected broadcasts.

In accordance with an embodiment, information may be transmitted from the vehicle data recorder 304 or central computer to a landing gear WNC that the airplane is currently in flight and that the estimated time of arrival is 5 hours from the current time. The WNC may use this information to sleep or go into a quiescent mode for a predetermined time period, for example, the next 4 hours. After expiration of the predetermined time period the WNC may wake up or become switch to an active mode and transmit a request for an update on the estimated time of arrival from the vehicle data recorder or central computer. Based on the information returned to the WNC, the WNC may return to the sleep or quiescent mode for a second predetermined time period. This is an example of a WNC changing its behavior to reduce its power consumption based on the received information. The WNC may execute a power saving function based on the information or command. The power saving function may include but is not necessarily limited to at least one of an extended sleep mode duration, a reduced sensor sample rate, an extended transmission interval, a reduced transmission power level, a reduced processor clock speed, a reduced amplifier setting, sleeping or turning off one or more selected components of the WNC.

Figure 4:
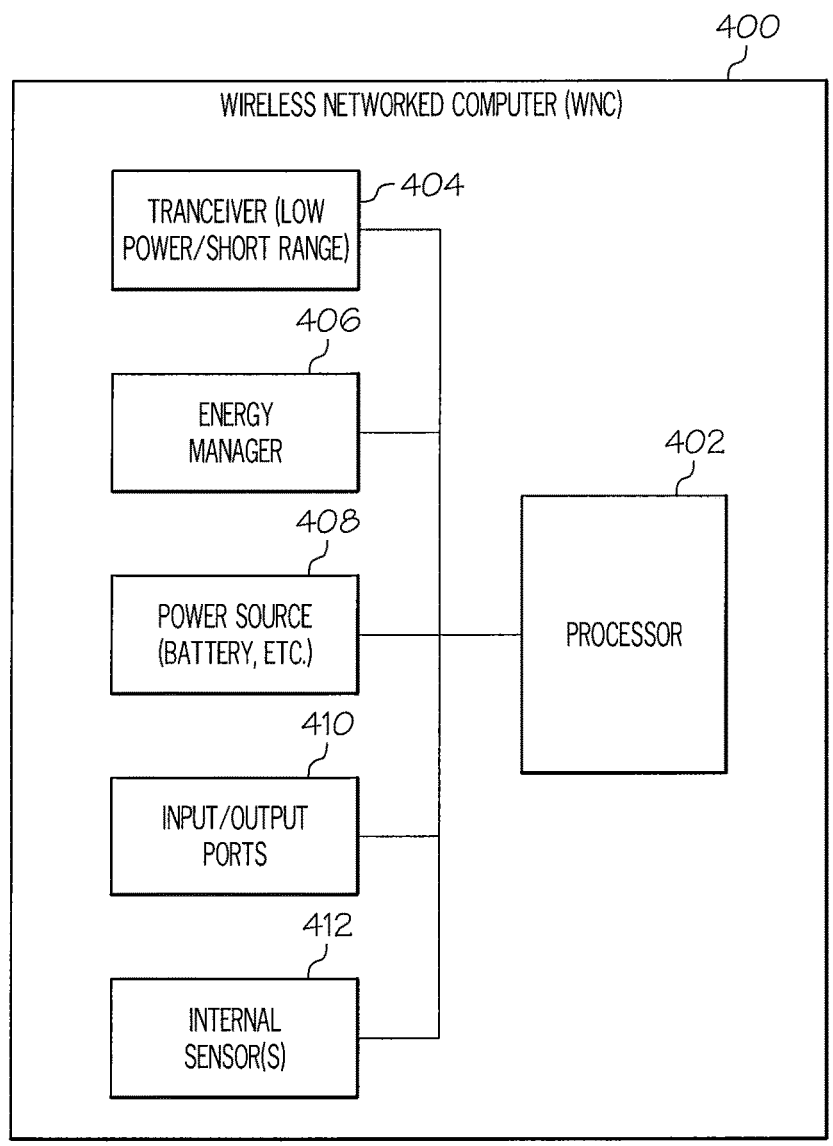
FIG. 4 is a block schematic diagram of an example of a wireless networked computer in accordance with an embodiment of the present disclosure.

FIG. 4 is a block schematic diagram of an example of a WNC 400 in accordance with an embodiment of the present disclosure. The WNC 400 may include a processor 402 for controlling operation of the WNC and performing the functions described herein, such as those described with reference to blocks or modules 132-140 of FIG. 1B. The WNC 400 may also include a transceiver 404, energy manager 406, power source 408, input and output ports or combination input/output ports 410 and an internal sensor or sensors 412. The transceiver 404 may be a low power/short range transceiver with sufficient power or range to communicate with a transceiver of a vehicle data recorder, such as transceiver 316 of the vehicle data recorder 304 in FIG. 3.

The energy manager 406 may control operation of the WNC 400 so as to minimize use of the power source 408 which may be a storage battery or other self-contained electrical power source.

The input and output ports or combination input/output ports 410 may be electrically connected to local sensors or other monitoring devices. The local sensors or other devices may be associated with a vehicle component or system of the vehicle to monitor a condition of the vehicle component or system and to transmit data regarding the monitored component or system to the WNC 400.

The internal sensor or sensors 412 may also be associated with a vehicle component or system to monitor a condition of the component or system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A method for monitoring systems of a vehicle, comprising:
   receiving data by a vehicle data recorder onboard the vehicle from a plurality of sensors associated with the systems of the vehicle;
   determining, by a processor, relevant information from the received data that is used by each of a plurality of wireless networked computers onboard the vehicle based on at least a function performed by each wireless networked computer with respect to an associated one of a multiplicity of components of the systems of the vehicle;
   formulating, by the processor, using a configuration table, a particular different customized information message for each of the plurality of wireless networked computers, wherein the configuration table comprises:
      an identification of a particular wireless networked computer for each of the plurality of wireless networked computers;
      relevant information used by the particular wireless networked computer associated with the identification for each particular wireless networked computer;
      a condition or criteria associated with the use of the relevant information or operation of the particular wireless networked computer associated with the identification for each particular wireless networked computer; and
      a specification for formatting and transmitting the particular different customized information message associated with the identification for each particular wireless networked computer; and
   transmitting, by a transceiver, each particular different customized information message directly within the vehicle to different ones of the plurality of wireless networked computers designated to receive each particular different customized information message according to the configuration table.

2. The method of claim 1, further comprising:
   processing the data to provide the relevant information; and
   storing the relevant information by the vehicle data recorder.

3. The method of claim 2, further comprising cataloguing the relevant information based on at least one of a source of the data from which the relevant information is processed, a use of the relevant information, and which ones of the plurality of wireless networked computers use the relevant information.

4. The method of claim 1, wherein the configuration table further comprises an identification of any wireless networked computer that receives at least a subset of information in one of the customized information messages transmitted directly within the vehicle from another one of the wireless networked computers.

5. The method of claim 2, further comprising retrieving the relevant information by a parameter broadcast controller of the vehicle data recorder to formulate each particular different customized information message for each of the plurality of wireless networked computers.

6. The method of claim 5, further comprising parsing the relevant information by the parameter broadcast controller to be transmitted in the customized information message.

7. The method of claim 1, wherein a certain wireless networked computer executes a power saving function based on the particular different customized information message received by the certain wireless networked computer, the power saving function comprising at least one of an extended sleep mode duration, a reduced sensor sample rate, an extended transmission interval, a reduced transmission power level, a reduced processor clock speed, a reduced amplifier setting, sleeping and turning off one or more selected components of the certain wireless networked computer.

8. The method of claim 1, further comprising receiving each particular different customized information message by different ones of the plurality of wireless networked computers designated to receive each particular different customized information message.

9. The method of claim 8, further comprising forming and transmitting a secondary customized message comprising a subset of the information in a certain customized information message to an associated wireless networked computer by a wireless networked computer that received the certain customized information message.

10. The method of claim 8, further comprising:
   receiving data from at least one local sensor by at least one wireless networked computer associated with the at least one local sensor;
   integrating the data from the at least one local sensor with the relevant information by the at least one wireless networked computer; and
   transmitting resulting information from integrating the data from the at least one local sensor with the relevant information to the vehicle data recorder by the at least one wireless networked computer, wherein the resulting information is used to monitor the component associated with the at least one wireless networked computer.

11. The method of claim 1, wherein each particular different customized information message is transmitted based on predetermined criterion, the predetermined criterion comprising a rate of transmission based on the component being monitored, a frequency of the relevant information being updated, an operational status of the component being monitored, and an operational status of the vehicle.

12. The method of claim 1, wherein the vehicle is an airplane.

13. A system for monitoring systems of a vehicle, comprising:
   a plurality of wireless networked computers onboard the vehicle; and
   a vehicle data recorder comprising:
      a processor, the processor being configured to:
         receive data from a plurality of sensors associated with the systems of the vehicle;
         determine relevant information from the received data that is used by each of the plurality of wireless networked computers based on at least a function performed by each wireless networked computer with respect to an associated one of a multiplicity of components of the systems of the vehicle;

formulate, using a configuration table, a particular different customized information message for each of the plurality of wireless networked computers, wherein the configuration table comprises:

an identification of a particular wireless networked computer for each of the plurality of wireless networked computers;

relevant information used by the particular wireless networked computer associated with the identification for each particular wireless networked computer;

a condition or criteria associated with the use of the relevant information or operation of the particular wireless networked computer associated with the identification for each particular wireless networked computer; and a specification for formatting and transmitting the particular different customized information message associated with the identification for each particular wireless networked computer; and wherein the vehicle data recorder further comprises:

a transceiver to transmit each particular different customized information message directly within the vehicle to different ones of the plurality of wireless networked computers designated to receive each particular different customized information message according to the configuration table.

14. The system of claim 13, wherein the processor processes the data to provide the relevant information and stores the relevant information in a data store.

15. The system of claim 13, wherein each wireless networked computer comprises:

a transceiver for receiving the particular different customized information message designated for the wireless networked computer;

a port for receiving data from at least one local sensor associated with the wireless networked computer; and a processor for integrating the data from the at least one local sensor with the relevant information, wherein the transceiver transmits resulting information from integrating the data from the at least one local sensor with the relevant information to the vehicle data recorder, the resulting information being used to monitor the component associated with the wireless networked computer.

16. The system of claim 15, further comprising an associated wireless networked computer that receives a secondary customized message comprising a subset of the relevant information from another wireless networked computer designated to receive the customized information message.

17. The system of claim 13, wherein the vehicle is an airplane.

18. A computer program product for monitoring systems of a vehicle, the computer program product comprising:

a non-transitory computer readable storage medium having computer readable program code embodied therewith, the computer readable program code comprising:

computer readable program code configured to receive data from the plurality of sensors associated with the systems of the vehicle;

computer readable program code configured to determine relevant information from the received data that is used by each of a plurality of wireless networked computers onboard the vehicle based on at least a function performed by each wireless networked computer with respect to an associated one of a multiplicity of components of the systems of the vehicle;

computer readable program code configured to formulate, using a configuration table, a particular different customized information message for each of the plurality of wireless networked computers, wherein the configuration table comprises;

an identification of a particular wireless networked computer for each of the plurality of wireless networked computers;

relevant information used by the particular wireless networked computer associated with the identification for each particular wireless networked computer;

a condition or criteria associated with the use of the relevant information or operation of the particular wireless networked computer associated with the identification for each particular wireless networked computer; and a specification for formatting and transmitting the particular different customized information message associated with the identification for each particular wireless networked computer; and computer readable program code configured to transmit each particular different customized information message directly within the vehicle to different ones of the plurality of wireless networked computers designated to receive each particular different customized information message according to the configuration table.

19. The method of claim 1, wherein the vehicle is an airplane, the method further comprising formatting and transmitting each particular different customized information message in response to a particular state or condition of the airplane.

20. The method of claim 1, wherein formatting and transmitting each particular different customized information message comprises formatting and transmitting each particular different customized information message at a predetermined frequency in response to the state or condition of the airplane.

21. The method of claim 1, wherein each particular different customized information message comprises the relevant information and a command for performing a function by the wireless networked computer designated to receive the particular different customized information message, the function being performed by the wireless networked computer is with respect to the associated one of the multiplicity of components of the systems of the vehicle.

22. The method of claim 1, wherein each of the plurality of wireless networked computers comprises a port that is electrically connectable to a local sensor associated with a particular system of the vehicle.

23. The method of claim 1, further comprising generating the configuration table, wherein generating the configuration table comprises providing a first column, the first column comprising, in each row of a plurality of rows of the configuration table, the identification of the particular wireless networked computer of the plurality of wireless networked computers.

24. The method of claim 23, wherein generating the configuration table comprises providing a second column, the second column comprising, in each row of the plurality of rows, the relevant information used by the particular wireless networked computer identified in the first column of a corresponding row.

25. The method of claim 23, wherein generating the configuration table comprises providing another column, the other column comprising, in each row of the plurality of rows, the condition or criteria associated with the particular wireless networked computer identified in the first column of the corresponding row.

26. The method of claim 23, wherein generating the configuration table comprises providing another column, the other column comprising, in each row of the plurality of rows, the specification for formatting and transmitting the particular different customized information message to the particular wireless networked computer identified in the first column of corresponding row.

27. The method of claim 24, wherein generating the configuration table comprises:
   providing a third column, the third column comprising, in each row of the plurality of rows, the condition or criteria associated with the particular wireless networked computer identified in the first column of the corresponding row; and
   providing a fourth column, the fourth column comprising, in each row of the plurality of rows, the specification for formatting and transmitting the particular different customized information message to the particular wireless networked computer identified in the first column of corresponding row.

28. The method of claim 1, wherein transmitting each particular different customized information message comprises transmitting each particular different customized message according to a rate or frequency specified in the configuration table.

29. The method of claim 1, further comprising:
   transmitting each particular different customized information message comprises transmitting each particular different customized message according to a rate or frequency specified in the configuration table; and
   updating the relevant information based on a frequency specified in the configuration table.

* * * * *